(12) United States Patent
Hong

(10) Patent No.: US 12,488,868 B2
(45) Date of Patent: Dec. 2, 2025

(54) METHOD AND SYSTEM FOR PROVIDING NON-FACE-TO-FACE ELECTRONIC PRESCRIPTION SERVICE

(71) Applicant: LEMONHEALTHCARE LTD, Seoul (KR)

(72) Inventor: Byung Jin Hong, Seoul (KR)

(73) Assignee: LEMONHEALTHCARE LTD, Seoul (KR)

( * ) Notice: Subject to any disclaimer, the term of this patent is extended or adjusted under 35 U.S.C. 154(b) by 163 days.

(21) Appl. No.: 18/456,577

(22) Filed: Aug. 28, 2023

(65) Prior Publication Data

US 2023/0402148 A1  Dec. 14, 2023

Related U.S. Application Data

(63) Continuation-in-part of application No. 18/002,777, filed as application No. PCT/KR2021/007757 on Jun. 23, 2021, now abandoned.

(30) Foreign Application Priority Data

Jun. 23, 2020  (KR) .......................... 10-2020-0076394

(51) Int. Cl.
  *G16H 20/10* (2018.01)
  *G16H 10/60* (2018.01)
(52) U.S. Cl.
  CPC ............. *G16H 20/10* (2018.01); *G16H 10/60* (2018.01)
(58) Field of Classification Search
  None
  See application file for complete search history.

(56) References Cited

U.S. PATENT DOCUMENTS 11,574,720 B2   2/2023   Hong et al.
2003/0088771 A1*  5/2003   Merchen ............... H04L 63/101
                                     713/178

(Continued)

FOREIGN PATENT DOCUMENTS

KR   1020120076660 A    7/2012
KR    10-1569801 B1    11/2015

(Continued)

OTHER PUBLICATIONS

Gudeman et al., Potential Risks of Pharmacy Compounding, Drugs R D (2013) 13:1-8, https://doi.org/10.1007/s40268-013-0005-9 (Year: 2013).*

*Primary Examiner* — Jonathon A. Szumny
*Assistant Examiner* — Nicholas Akogyeram, II
(74) *Attorney, Agent, or Firm* — ZION IP; Byungwoong Park

(57) ABSTRACT

Proposed is a method and system for providing a non-face-to-face electronic prescription service, where a hospital server provides a prior agreement for a non-face-to-face electronic prescription service to a user terminal, and the user terminal applies for the prescription service based on the agreement and transmits the confirmed matters to the hospital server and a cloud server; the hospital server and the cloud server store whether a patient has applied for the prescription service by storing the confirmed matters based on a user ID; when the user requests payment to the cloud server, the cloud server requests payment to the hospital by executing a payment API; the hospital server stores details of payment, extracts prescription information from an EMR, and transmits the prescription information to the cloud server; and the cloud server creates prescriptions for patient and a pharmacy when the prescription information is received from the hospital.

1 Claim, 11 Drawing Sheets

(56) References Cited

U.S. PATENT DOCUMENTS

| | | | | |
|---|---|---|---|---|
| 2006/0149587 A1* | 7/2006 | Hill | ............... | G16H 40/67 |
| | | | | 600/300 |
| 2019/0148013 A1* | 5/2019 | Pulitzer | ............ | G06N 3/042 |
| | | | | 706/11 |

FOREIGN PATENT DOCUMENTS

| | | | | |
|---|---|---|---|---|
| KR | 10-2018-0047226 A | 5/2018 | | |
| KR | 10-1985011 B1 | 5/2019 | | |
| KR | 10-1989474 B1 | 6/2019 | | |
| KR | 10-2249664 B1 | 5/2021 | | |
| WO | WO-03046789 A1 * | 6/2003 | ............ | G06Q 10/10 |

* cited by examiner (a) (b)

METHOD AND SYSTEM FOR PROVIDING NON-FACE-TO-FACE ELECTRONIC PRESCRIPTION SERVICE

CROSS-REFERENCE TO RELATED APPLICATIONS

This application is a continuation in part of U.S. patent application Ser. No. 18/002,777, filed on Dec. 21, 2022, the entire contents of which are hereby incorporated by reference.

BACKGROUND

Field

The present disclosure relates to a method and system for providing a non-face-to-face electronic prescription service, particularly, a method and system for providing a non-face-to-face electronic prescription service, the method and system transmitting an electronic prescription through a mobile to minimize contact between unrelated people until compounding after medical examination and treatment by changing a prescription issuance procedure into a non-face-to-face type.

Related Art

Demands for a non-face-to-face medical service are increasing with the prevalence of new types of contagious diseases. Recently, due to COVID-19, the Korean government has given temporal permission for patients to transmit a prescription, which is issued after medical examination and treatment, to pharmacies in the whole country through a mobile application without an additional procedure. Considering the tendency of the contagious disease, this measure is not expected to end as a temporal measure and the need for a non-face-to-face electronic prescription service will further increase.

Meanwhile, an existing electronic prescription service has many inconveniences because when a hospital transmits an electronic prescription for patient to a user terminal, the user has to go to a pharmacy in person and show the user terminal or uses a QR code for compounding of a medicine, and has a problem in that the service is limited, depending on the state of a patient terminal, the payment type for medical expenses, whether an electronic prescription issuance has been agreed upon, etc.

As a prior patent, there is Korean Patent No. 10-1989474 (System and method for transmitting electronic prescription based on cloud computing), but this discloses only a technology about an standardized API for creating electronic prescription regardless of the DBMS of hospital servers and the kinds of developing languages.

SUMMARY

An objective of the present disclosure is to provide a method and system for providing a non-face-to-face electronic prescription service, the method and system being able to issue an electronic prescription through a mobile to minimize contact between unrelated people till reception of a medicine after medical examination and treatment of a patient who confirmed a prior consent.

A method of providing a non-face-to-face electronic prescription service according to an embodiment of the present disclosure includes: a step in which a hospital server provides, over a wireless network via a graphical user interface (GUI), a prior agreement for a non-face-to-face electronic prescription service to a wireless user terminal, and the wireless user terminal applies, via a GUI, for a non-face-to-face electronic prescription service on the basis of the received prior agreement and transmits the confirmed matters in the agreement to the hospital server and a cloud server; a step in which the hospital server and the cloud server automatically store whether a remote patient has applied for the non-face-to-face electronic prescription service in a storage unit by storing the agreement confirmed matters on the basis of a user ID; a step in which when the wireless user terminal requests payment to the cloud server by executing a payment service, the cloud server automatically requests payment to the hospital server by executing a payment API; a step in which the hospital server automatically stores details of payment, extracts prescription information from an EMR, and automatically transmits the prescription information to the cloud server; a step in which the cloud server automatically generates a prescription for the remote patient and a prescription for a pharmacy when the cloud server receives the prescription information from the hospital server; a step in which when the cloud server transmits the created automatically generated prescription for the remote patient to the wireless user terminal, the wireless user terminal, via a GUI, checks the prescription for the remote patient and requests compounding of a medicine to the cloud server; a step in which the cloud server automatically executes a prescription API and automatically requests compounding of a medicine to a pharmacy server when receiving the request for compound of a medicine from the wireless user terminal; a step in which the pharmacy server automatically requests prescription information from the cloud server by automatically executing a pharmacy demon program when receiving the request for compounding of a medicine from the cloud server; a step in which the cloud server automatically informs the wireless user terminal whether prior compounding is possible, and when the wireless user terminal requests, via a GUI, the prior compounding to the pharmacy server, the pharmacy server automatically transmits whether the prior compounding has been permitted to the wireless user terminal; a step in which the pharmacy server automatically requests and receives certificate information of a hospital issuing the electronic prescription from the hospital server, and automatically instructs a pharmacy to perform a medicine compounding service; and a step in which the wireless user terminal automatically displays, via a GUI, a QR code, the pharmacy server automatically recognizes the QR code and automatically stores an electronic signature of the pharmacy and the electronic prescription.

The pharmacy server automatically transmits and stores an electronic prescription including the electronic signature of the pharmacy to a certified e-document authority server.

A pharmacy daemon program is automatically operated with a pharmacy manager program, when a medicine starts to be compounded at the pharmacy, the original of the electronic prescription is controlled to prevent other pharmacies from compounding the medicine based on the electronic prescription, automatically inform the remote patient, in real time, of the states of receipt request, receipt confirmation, compounding completion, and reception completion through a GUI of the wireless user terminal using the pharmacy manager program, a pharmacy desk PC automatically transmits prescription data to the pharmacy manager program, automatically performs encoding/decoding with an external interface, and automatically transmits QR code data using a virtual serial port, According to an exemplary embodiment, the prescription information is automatically converted into standardized prescription information by an API builder, regardless of a heterogeneous database management system (DBMS) of the hospital server, so that the hospital server is permitted to store the prescription information in a non-standardized format dependent on a hardware and a software platform used by the hospital server.

According to the present disclosure, it is possible to minimize movement of a patient in a hospital and reduce the time for compounding a medicine at a pharmacy by requesting prior compounding of a medicine by transmitting an electronic prescription in a non-face-to-face type.

As noted above, when a medicine starts to be compounded at a pharmacy, the original version of the electronic prescription is controlled, so other pharmacies are set not to compound a medicine, so it is possible to prevent repetitive compounding at other pharmacies.

Also, the pharmacy daemon program may automatically cause the remote patient to be informed, in real time, of the states of the compounding of the medicine through a GUI of the wireless user terminal when the wireless user terminal is locally connected to the pharmacy server via the wireless network. Further, URL link may be sent by the pharmacy server to the wireless user terminal so that the remote patient may connect the pharmacy server via the URL link.

Further, the electronic prescription that is provided to a pharmacy is the same in form as existing paper prescriptions, so there is no difficulty in coping with the electronic prescription and work efficiency can be increased at the pharmacy.

DESCRIPTION OF EXEMPLARY EMBODIMENTS

Figure 1:
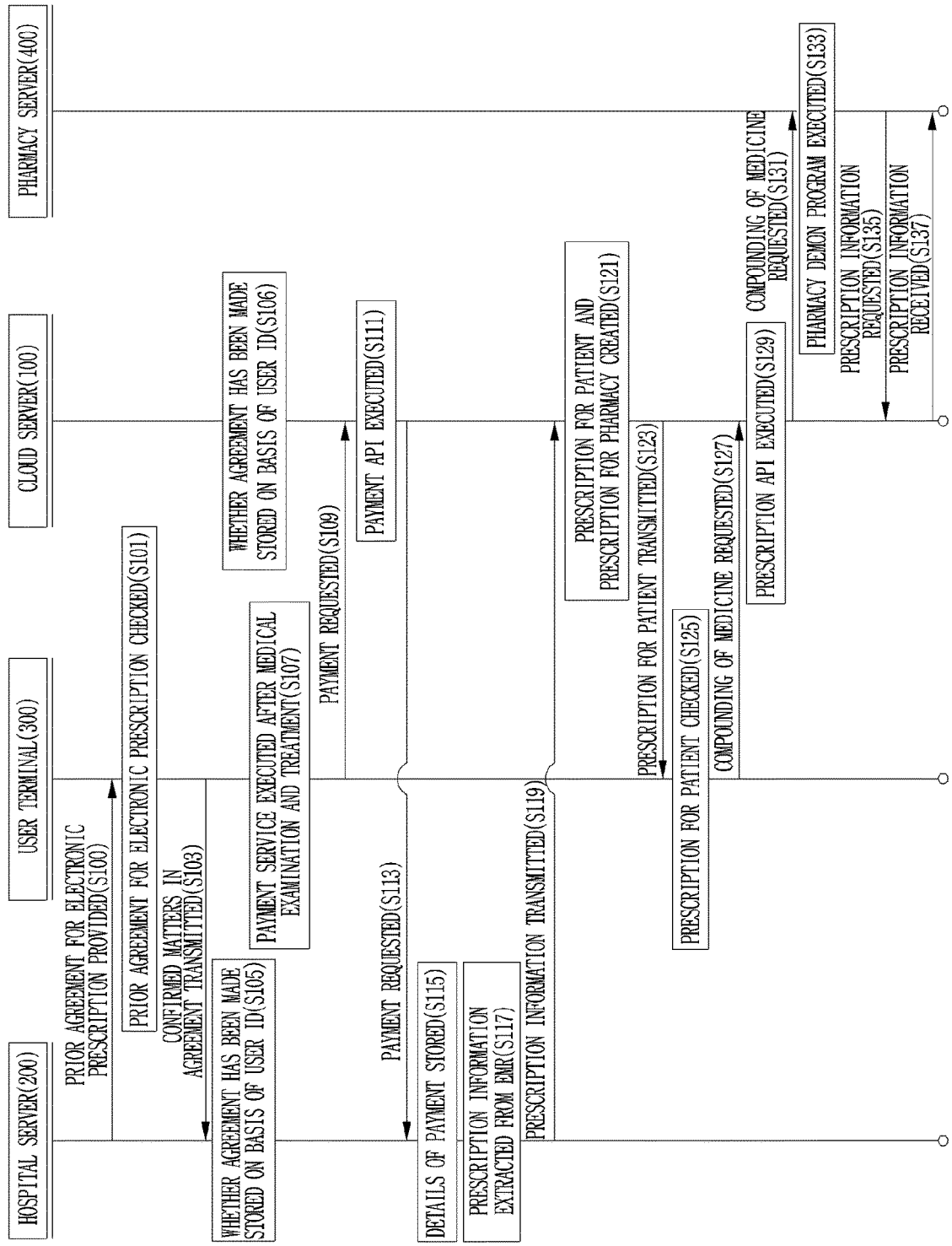
FIGS. 1 and 2 are flowcharts illustrating a method and system for providing a non-face-to-face electronic prescription service according to an embodiment of the present disclosure.

Specific structural and functional description about embodiments according to the concept of the present disclosure disclosed herein is exemplified only to describe the embodiments according to the concept of the present disclosure and the embodiments according to the concept of the present disclosure may be implemented in various ways and are not limited to the embodiments described herein.

Embodiments described herein may be changed in various ways and various shapes, so specific embodiments are shown in the drawings and will be described in detail in this specification. However, it should be understood that the exemplary embodiments according to the concept of the present disclosure are not limited to the specific examples, but all of modifications, equivalents, and substitutions are included in the scope and spirit of the present disclosure.

Terms used in the present invention are used only in order to describe specific exemplary embodiments rather than limit the present invention. Singular forms are intended to include plural forms unless the context clearly indicates otherwise. It will be further understood that the terms "comprises" or "have" used in this specification, specify the presence of stated features, numbers, steps, operations, components, parts, or a combination thereof, but do not preclude the presence or addition of one or more other features, numerals, steps, operations, components, parts, or a combination thereof.

The non-face-to-face type stated in the present disclosure means all types of medical examination and treatment without meeting a doctor in person such as telemedicine, video medicine, and telephone medicine.

Hereafter, various embodiments of the present disclosure are described in detail with reference to the accompanying drawings.

Figure 2:
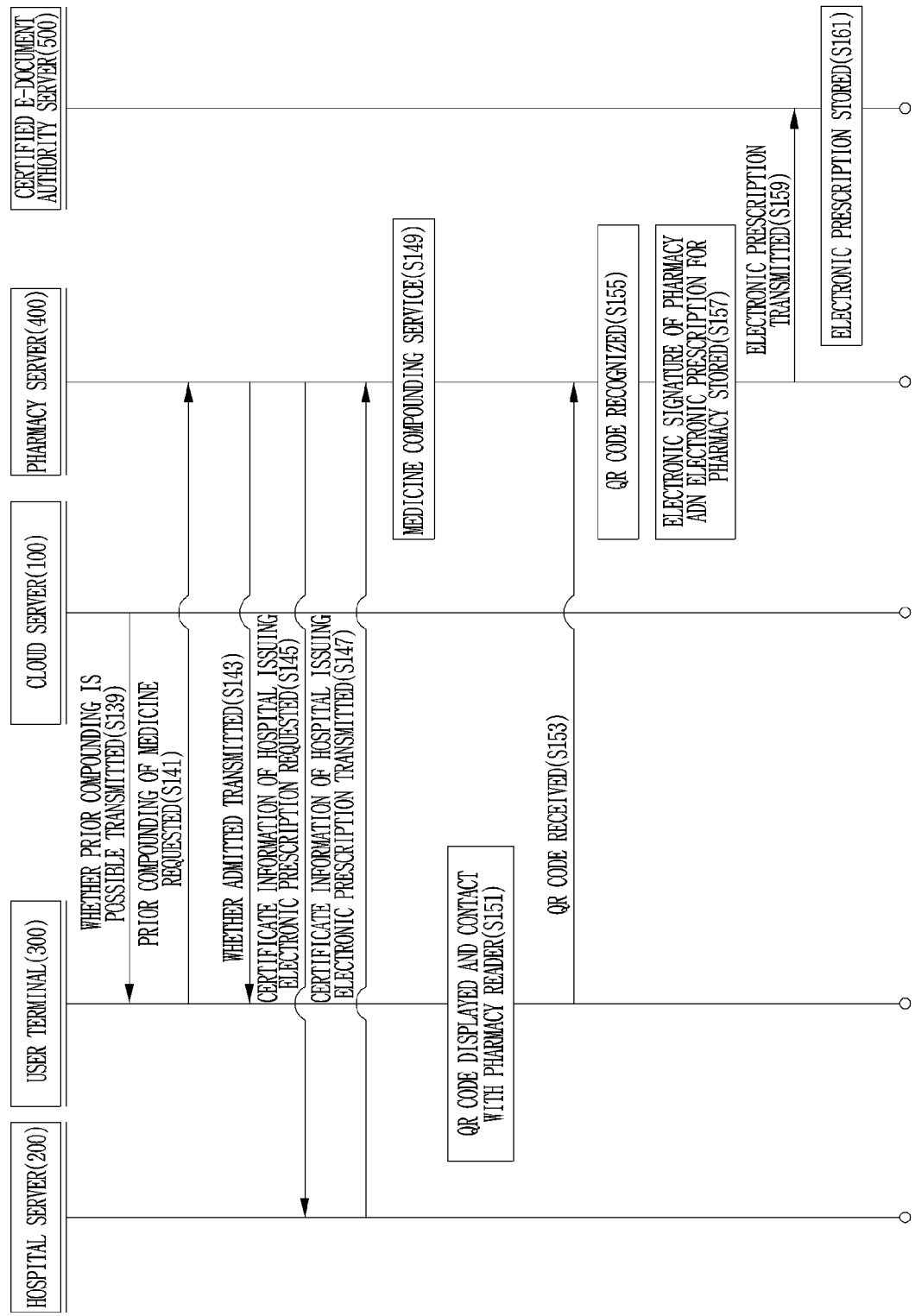

FIGS. 1 and 2 are flowcharts illustrating a method and system for providing a non-face-to-face electronic prescription service according to an embodiment of the present disclosure.

Referring to FIGS. 1 and 2, according to a method of providing a non-face-to-face electronic prescription service of the present disclosure, first, a hospital server 200 provides a prior agreement for a non-face-to-face electronic prescription service to a user terminal 300 (S100). The user terminal 300 can apply for a non-face-to-face electronic prescription service by selecting agreement in the received prior agreements. The user terminal 300 transmits the confirmed matters in the agreement to the hospital server 200 (S103). Further, the user terminal 300 transmits the confirmed matters in the agreement to a cloud server (S104).

The hospital server 200 stores whether a patient has applied for the non-face-to-face electronic prescription service by storing the confirmed matters in the agreement on the basis of a user ID (S105). Further, the cloud server 100 stores whether the patient has applied for the non-face-to-face electronic prescription service by storing the confirmed matters in the agreement on the basis of a user ID (S106).

When the user terminal 300 executes a payment service and requests payment to the cloud server 100, the cloud server 100 requests payment to the hospital server by executing a payment API.

The hospital server 200 stores the details of the payment (S115), extracts prescription information based on the user ID from an EMR of the hospital server and transmits the prescription information to the cloud server 100 (S119).

When the cloud server 100 receives the prescription information from the hospital server 200, the cloud server 100 creates a prescription for patient and a prescription for a pharmacy on the basis of the prescription information (S121). The cloud 100 transmits the prescription for patient to the user terminal 300 (S123). The user terminal 300 checks the received prescription for patient and requests compounding of a medicine to the cloud server (S127). When receiving the request for compounding of a medicine from the user terminal 300, the cloud server 100 executes a prescription API (S129) and requests compounding of a medicine to a pharmacy server 400 (S131).

When the pharmacy server 400 receives the request for compounding of a medicine from the cloud server 100 (S131), the pharmacy server 400 requests prescription information from the cloud server by executing a pharmacy daemon program. The pharmacy daemon program can perform at least one function of client registration, receipt request, receipt cancelation, compounding completion, incompounding, reception completion. The pharmacy daemon program is operated with a pharmacy manager program. When a medicine starts to be compounded at a pharmacy, the original of the electronic prescription is controlled, so other pharmacies can be set not to compound a medicine. It is possible to inform the patient of the states of receipt request, receipt confirmation, compounding completion, and reception completion through the user terminal using the pharmacy manager program. A pharmacy desk PC can transmit prescription data to the pharmacy manager program, perform encoding/decoding with an external interface, and transmit QR code data using a virtual serial port.

The cloud server 100 informs the user terminal whether prior compounding is possible, and when the user terminal requests prior compounding to the pharmacy server, the pharmacy server transmits whether prior compounding has been permitted to the user terminal.

The pharmacy server requests certificate information of the hospital issuing the electronic prescription from the hospital server (S415), and when the hospital server 200 transmits the certificate information of the hospital issuing the electronic prescription to the pharmacy server 400, the pharmacy server 400 receives the certificate information and performs a medicine compounding service. In this case, the electronic prescription that is provided to the pharmacy includes an image of an existing paper prescription and an electronic signature and is the same in form as the paper prescription, so there is no difficulty in coping with the electronic prescription and work efficiency can be increased at the pharmacy. In this case, when the QR in the prescription transmitted to the pharmacy server is clicked, a compounding program is opened and it is possible to immediately input prescription data. The pharmacy server includes a function of converting and transmitting a QR code, and when medicine information is clicked, the site that provides the medicine is connected, so it is possible to check the medicine information.

When a medicine finishes being compounded and the user terminal 300 displays the QR code and is brought into contact with a pharmacy reader prepared at the pharmacy, the pharmacy server 400 performs authentication by recognizing the QR code. When authentication is finished, the compounded medicine can be handed over to the patient. The pharmacy server stores an electronic signature of the pharmacy and the electronic prescription for a pharmacy (S157). In this case, the pharmacy server 400 can transmit and store an electronic prescription including the electronic signature of the pharmacy to a certified e-document authority server 500.

In the present disclosure, electronic prescriptions are encoded and transmitted in all procedures, can be opened only through the hospital server and the pharmacy server, and are automatically deleted after the available periods, so they are highly secure. Depending on embodiments, a service for applying an actual medical expense insurance for the pharmacy cost may also be operated.

Figure 3:
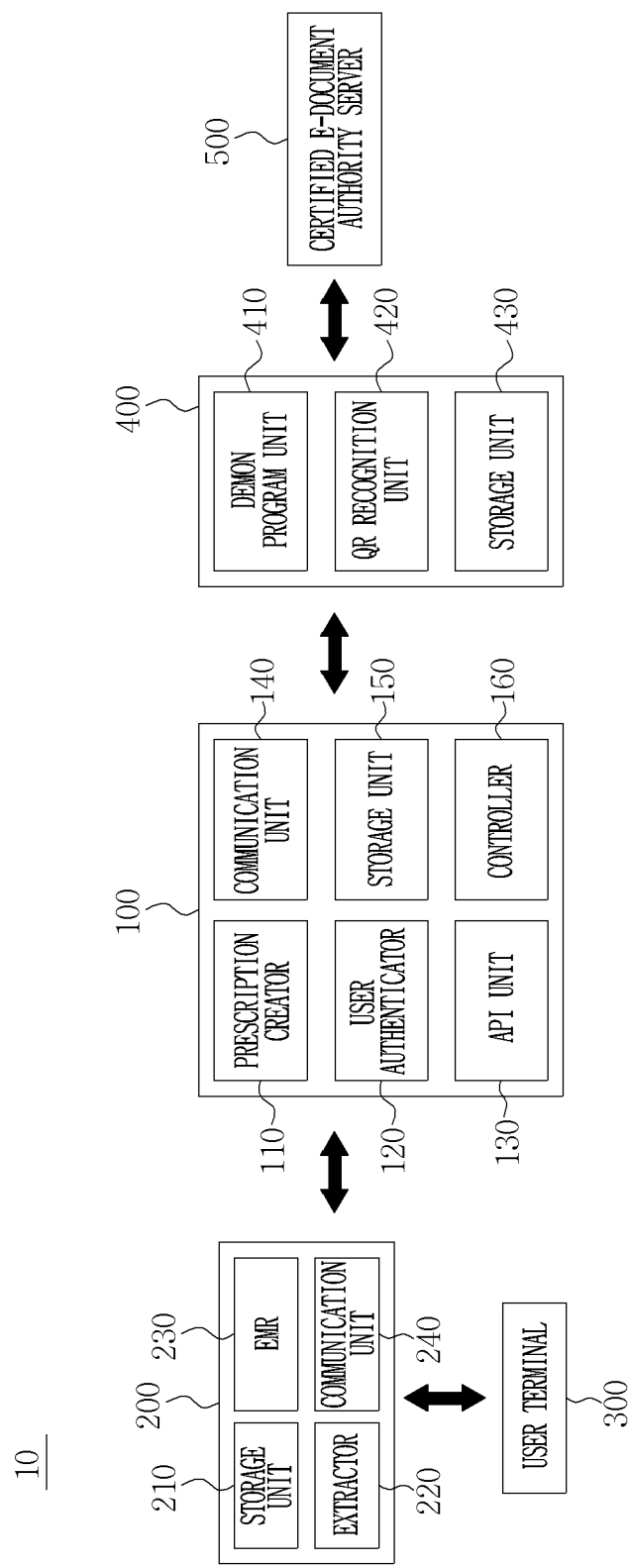
FIG. 3 is a configuration diagram of a system for providing a non-face-to-face electronic prescription service according to an embodiment of the present disclosure.

FIG. 3 is a configuration diagram of a system for providing a non-face-to-face electronic prescription service according to an embodiment of the present disclosure.

Referring to FIG. 3, a system 10 for providing a non-face-to-face electronic prescription service is composed of a cloud server 100, a hospital server 200, a user terminal 300, a pharmacy server 400, and a certified e-document authority server 500.

The cloud server 100 is composed of a prescription creator 110, a user authenticator 120, an API unit 130, a communication unit 140, a storage unit 150, and a controller 160.

When the prescription creator 110 receives prescription information from the hospital server 200, the cloud server 100 creates a prescription for patient and a prescription for a pharmacy on the basis of the prescription information (S121). The created prescription for patient and prescription for a pharmacy are temporarily stored in the storage unit, and are deleted when prescription is finished.

The user authenticator 120 stores whether a patient has applied for the non-face-to-face electronic prescription service in the storage unit by storing confirmed matters in an agreement on the basis of a user ID. When the user terminal requests payment, the user authenticator 120 performs authentication on the basis of the user ID.

The API unit 130 includes a payment API and a prescription API. The API unit includes several API modules such as a push API, an actual medical expense API, and a mobile API, but they are not described in detail herein. When the user terminal calls out a payment service or a prescription service, the API unit can perform the called service by loading an API matched to the called service.

The communication unit 140 can transmit and receive data to and from the hospital server 200, the user terminal 300, and the pharmacy server 400 through a wired/wireless communication module. The storage unit 150 receives the confirmed matters in the agreement and stores whether a patient has applied for the electronic prescription service. The storage unit 150 temporarily stores the prescription for patient and the prescription for a pharmacy created by the prescription creator and deletes the prescriptions when prescription is finished. The controller 160 controls the components of the cloud server.

The hospital server 200 is composed of a storage unit 210, an extractor 220, an EMR 230, and a communication unit 240. The storage unit 210 stores whether agreement has been made on the basis of a user ID when receiving confirmed matters in a prior agreement for an electronic prescription from the user terminal 300. The storage unit 210 stores details of payment. When the hospital server 200 transmits hospital certificate information to the pharmacy server 400, the hospital server 200 does not issue a corresponding electronic prescription in cooperation with an electronic prescription original control a pharmacopoeia program when another pharmacy requests electronic prescription information. Accordingly, the hospital server 200 can prevent repeated issuance of an electronic prescription.

The extractor 220 extracts the prescription information from the EMR on the basis of the user ID. Patient information, examination and treatment information, prescription information, hospital administration information, and history information may be stored in the EMR 230. The kind of the information that is stored in the EMR 230 is not limited. The communication unit 100 can transmit and receive data to and from the cloud server 100, the user terminal 300, and the pharmacy server 400 through a wired/wireless communication module.

The pharmacy server 400 is composed of a daemon program unit 410, a QR recognition unit 420, and a storage unit 43. The demon program unit 410 performs a server demon function and can perform a medicine compounding service in cooperation with a pharmacy manager program. When the QR in the prescription transmitted to the pharmacy server is clicked, a compounding program is opened and it is possible to immediately input prescription data through the daemon program unit 410. The pharmacy server includes a function of converting and transmitting a QR code, and when medicine information is clicked, the site that provides the medicine is connected, so it is possible to check the medicine information.

The demon program unit 410 can process data using at least one of a method of applying class search for a normal prescription and an electronic prescription to a prescription class, a method of applying an item for checking where the initial reception has come from, a method of searching for a prescription reception period, a method of enabling a function of checking the current state of a prescription, a method of applying a function of checking a receipt state, a method of applying color correction in a system program in accordance with a classification state, and a method of transmitting a prescription message to a patient by applying a function of adding boilerplates. The demon program unit 410 can inform a user terminal that compounding of a medicine is started and finished. The QR recognition unit 420 can recognize a QR displayed on the user terminal through a QR reader. The storage unit 430 can store an electronic signature of the pharmacy and the electronic prescription for a pharmacy.

The certified e-document authority server 500 can receive and store the electronic prescription including the electronic signature of the pharmacy from the pharmacy server.

Figure 4:
FIG. 4 is a diagram showing a prior agreement for a non-face-to-face electronic prescription service according to an embodiment of the present disclosure.

FIG. 4 is a diagram showing a prior agreement for a non-face-to-face electronic prescription service according to an embodiment of the present disclosure.

Referring to FIG. 4, it is an exemplary image of a prior agreement for a non-face-to-face electronic prescription service that is provided by an exclusive application. It is possible to fill out the prior agreement by inputting a patient name, a patient number, a phone number, whether to agree, an applicant signature. FIG. 4 shows an example, and a prior agreement may be prepared in offline and a patient can fill out the prior agreement.

Figure 5:
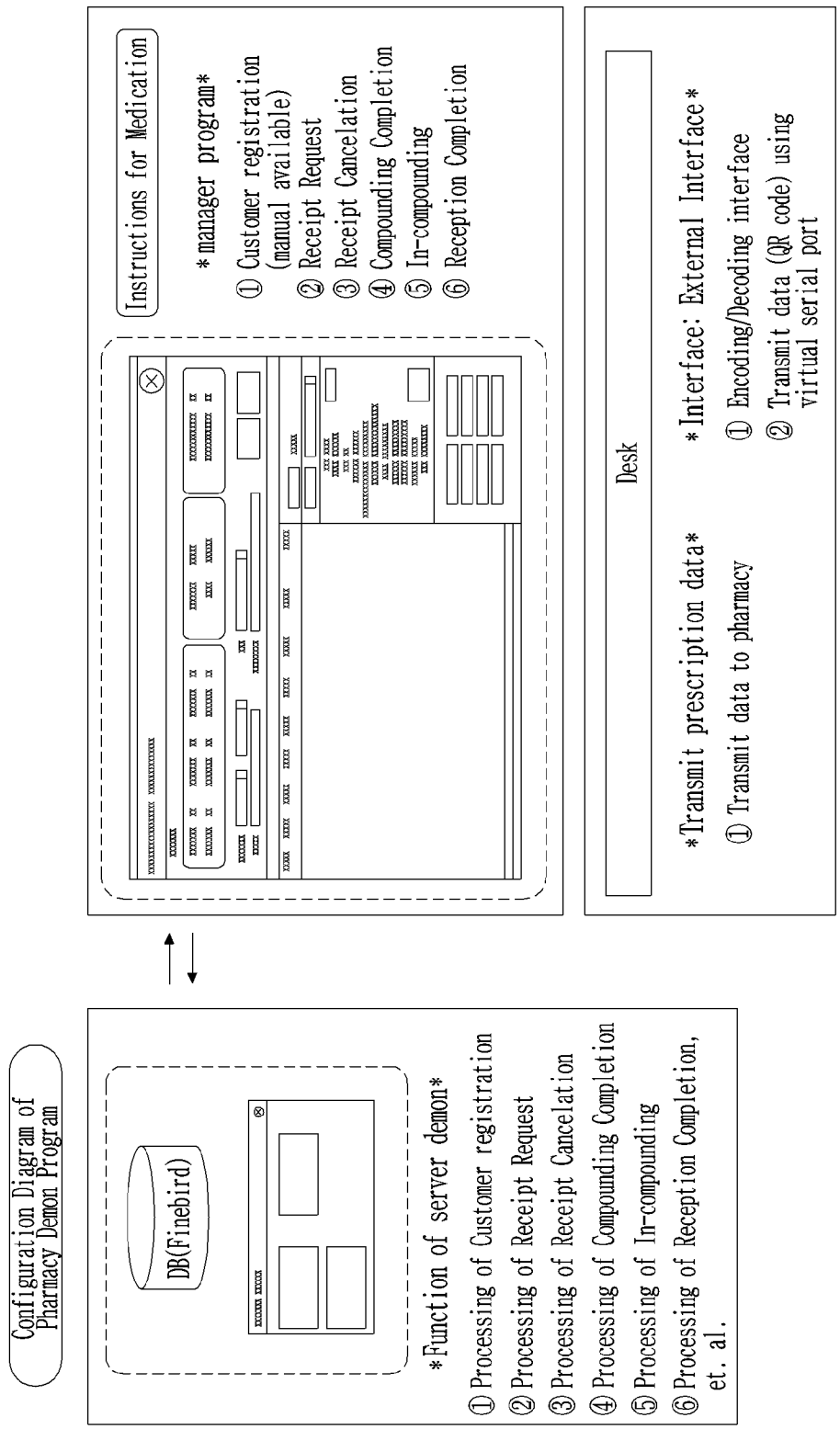
FIG. 5 is a configuration diagram of a pharmacy daemon program according to an embodiment of the present disclosure.

FIG. 5 is a configuration diagram of a pharmacy demon program according to an embodiment of the present disclosure.

Referring to FIG. 5, a pharmacy demon program performs a server demon function and the server demon function can perform at least one function of client registration, receipt request, receipt cancelation, compounding completion, in-compounding, reception completion. Further, the pharmacy demon program can be operated in cooperation with a pharmacy manager program. The pharmacy demon program can perform at least one function of client registration, receipt request, receipt cancelation, compounding completion, in-compounding, reception completion. The sever demon function and the manager program can transmit and receive data to and from each other.

When a medicine starts to be compounded at a pharmacy, the original of the electronic prescription is controlled, so other pharmacies can be set not to compound a medicine. It is possible to inform the patient of the states of receipt request, receipt confirmation, compounding completion, and reception completion through the user terminal using the pharmacy management program. A pharmacy desk PC includes a QR reader, and can transmit prescription data to the pharmacy manager program, perform encoding/decoding with an external interface, and transmit QR code data using a virtual serial port.

Figure 6:
FIG. 6 is a use state diagram of a non-face-to-face electronic prescription service according to an embodiment of the present disclosure.
Figure 6:
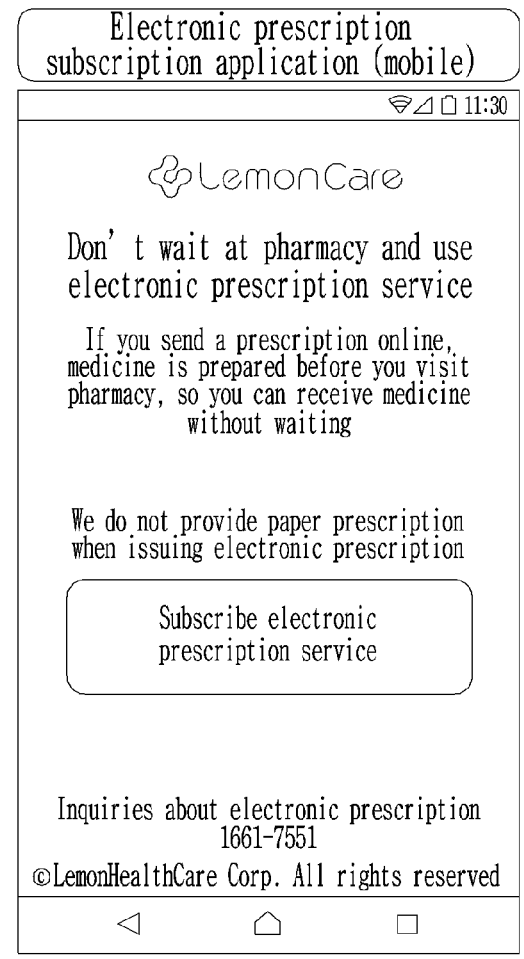

FIG. 6 is a use state diagram of a non-face-to-face electronic prescription service according to an embodiment of the present disclosure.

Referring to FIG. 6(*a*), it is an image showing a QR code that is prepared in a hospital so that patients fill out a prior agreement for an electronic prescription using a user terminal. Not only a QR code, but a URL may be provided to fill out a prior agreement.

Referring to FIG. 6(*b*), an exclusive application may be provided to subscribe an electronic prescription service. Prior agreement is required to subscribe an electronic prescription service and the image can be changed to a page requesting prior agreement.

Figure 7:
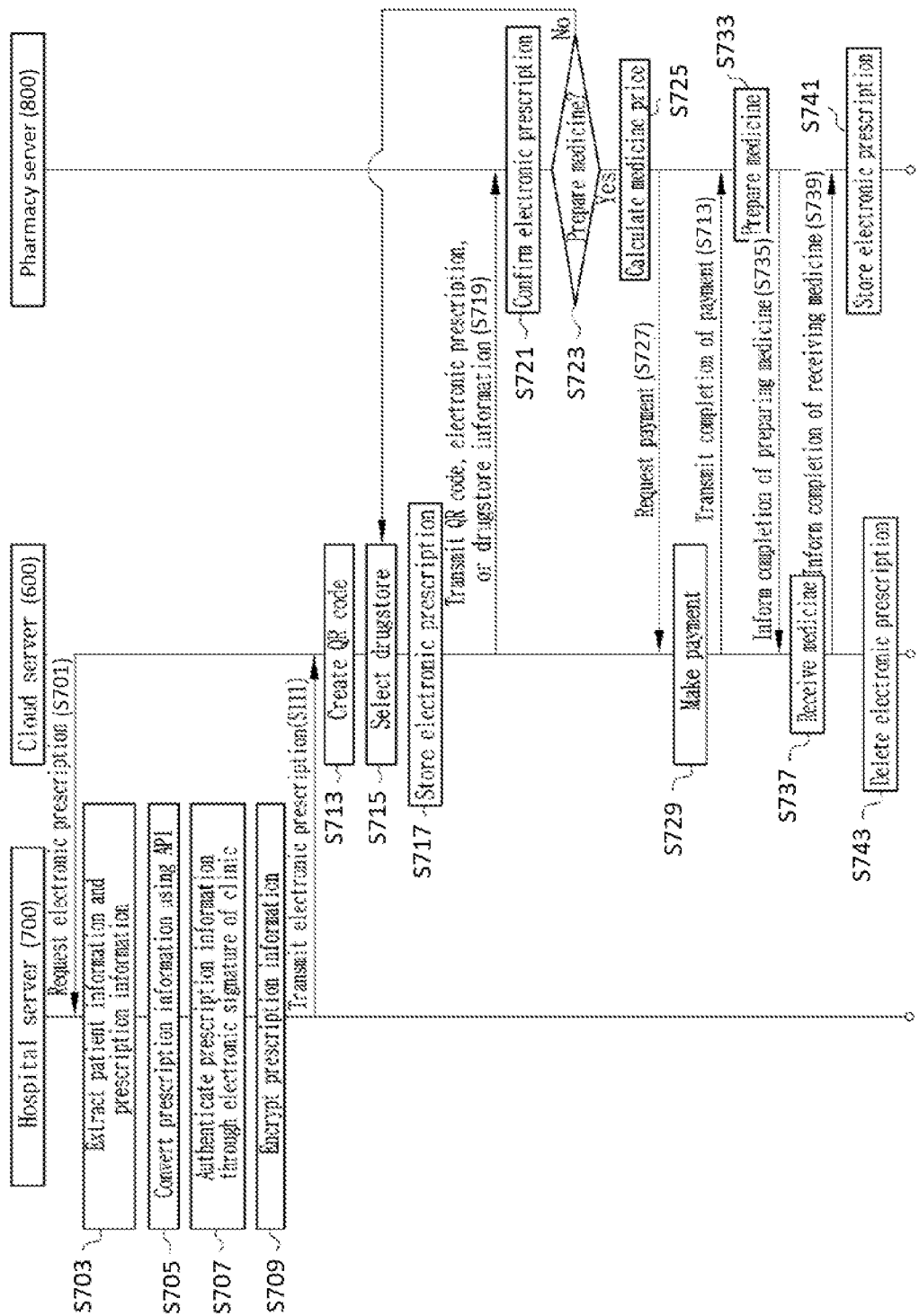
FIG. 7 is a sequence diagram illustrating a cloud-based electronic prescription transmission method according to an embodiment of the present disclosure.

FIG. 7 is a sequence diagram illustrating a cloud-based electronic prescription transmission method according to another exemplary embodiment.

Referring to FIG. 7, in a cloud-based electronic prescription transmission method, a cloud server 600 requests an electronic prescription from a hospital server 700 when a request for the electronic prescription is received from a user terminal 900 (step S701).

The hospital server 700 extracts patient information and prescription information stored in an EMR DB unit 710 (step S703), and an API builder unit 720 converts the prescription information according to an application programming interface (API) (step S705). At this point, the API is a standardized API which can convert the prescription information into standardized prescription information regardless of a heterogeneous database management system (DBMS) or a type of development language. The API builder unit 720 may create, manage and test an API for standardizing database information stored in the hospital server, such as the prescription information or the like. Although the API builder unit 720 may be installed and operate in the hospital server, it is not limited thereto. The API builder unit 720 converts the prescription information by extracting the prescription information from the EMR DB unit, creating a data source, creating an SQL query, and repeatedly performing test.

The hospital server 700 authenticates the converted prescription information through the electronic signature of the clinic (step S707) and encrypts the converted prescription information (step S709). The hospital server 700 transmits an electronic prescription to the cloud server 600 (step S711). The electronic prescription includes the converted prescription information and the patient information.

The cloud server 600 creates a QR code (step S713), and when a drugstore is selected by the user terminal 900, the cloud server 600 temporarily stores the electronic prescription (step S717). At this point, the QR code may be replaced by a hash code which provides location information of the prescription information. The cloud server 600 transmits at least one among the QR code, the electronic prescription, and drugstore information on the selected drugstore to a pharmacy server 800 (step S719).

The pharmacy server 800 confirms the electronic prescription (step S721), determines whether or not to prepare the medicine (step S723), and calculates a medicine price when preparation of the medicine is performed (step S725).

The pharmacy server 800 requests the cloud server 600 to make a payment (step S727), and when making the payment is completed by the user terminal 900, the cloud server 600 transmits completion of payment to the pharmacy server 800 (step S731).

The pharmacy server 800 prepares the medicine (step S733) and informs the cloud server 600 of completion of preparing the medicine when preparation of the medicine is completed (step S735), and when the cloud server 600 informs the pharmacy server 800 of completion of receiving the medicine (step S739), the pharmacy server 800 stores the electronic prescription, and the cloud server 600 deletes the electronic prescription (step S743).

That is, in an exemplary embodiment, prescription information may be transferred and used online through a cloud server at any time at any place, and as the electronic prescription is deleted from the cloud server when preparation of the medicine is completed, security of the system is enhanced. In addition, the time for receiving a prescription at a hospital, the time for preparing a medicine at a drugstore, and the waiting time for receiving the medicine can be reduced, and furthermore, it is possible to make a payment for the medicine, and user's convenience can be enhanced.

Figure 8:
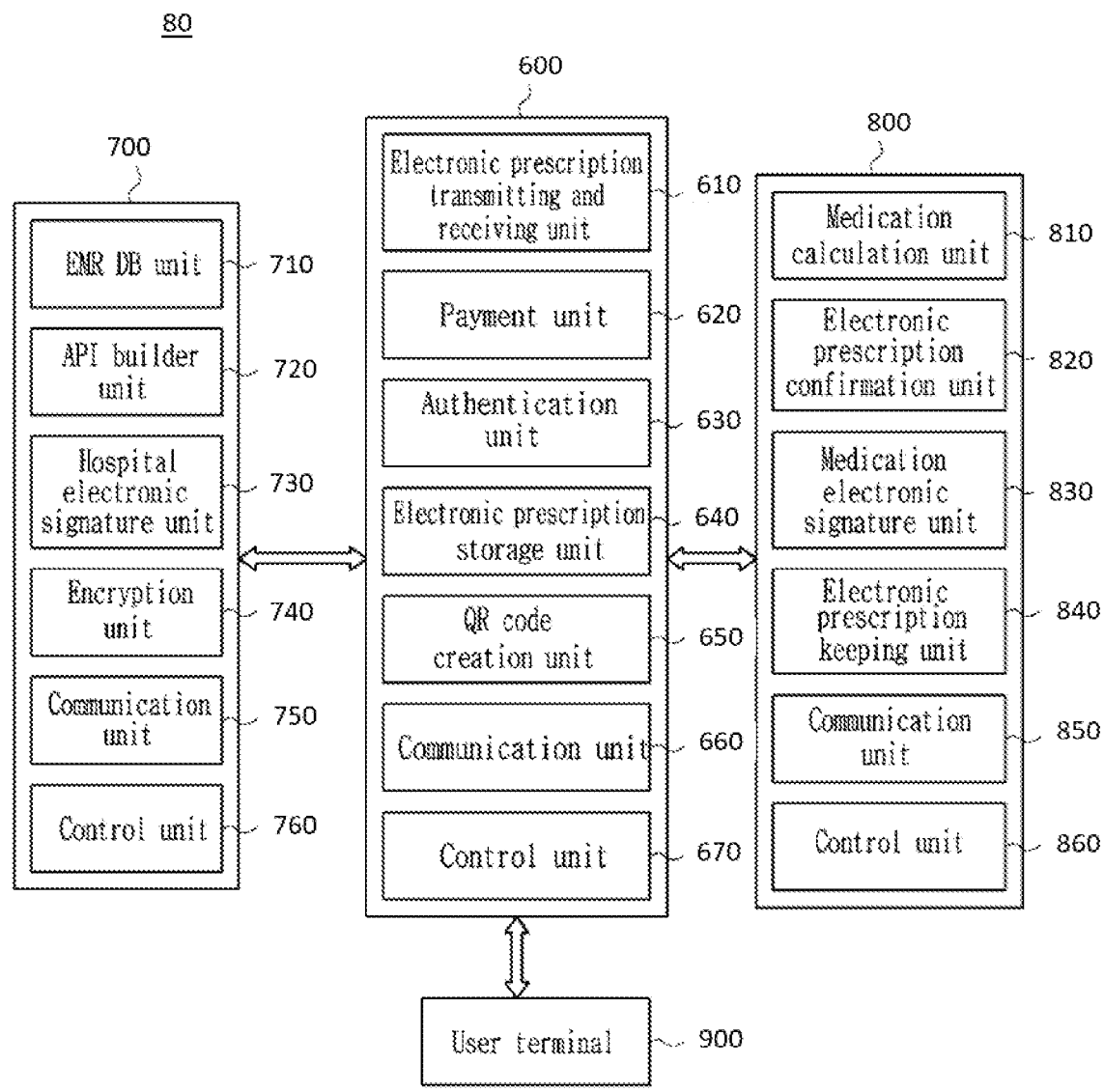
FIG. 8 is a view showing the configuration of an electronic prescription transmission system according to an embodiment of the present disclosure.

FIG. 8 is a view showing the configuration of an electronic prescription transmission system according to an embodiment.

Referring to FIG. 8, an electronic prescription transmission system 80 is configured of a cloud server 600, a hospital server 700, a pharmacy server 800, and a user terminal 900. When the user terminal 900 requests an electronic prescription, the cloud server 600 requests the electronic prescription from the hospital server 700, and the hospital server 700 converts and encrypts prescription information using a standardized API and provides the cloud server 600 with the electronic prescription. The cloud server 600 transfers the electronic prescription to the pharmacy server 800, and functions of preparing a medicine and making a payment are performed.

The cloud server 600 includes an electronic prescription transmitting and receiving unit 610, a payment unit 620, an authentication unit 630, an electronic prescription storage unit 640, a QR code creation unit 650, a communication unit 660, and a control unit 670.

When the user terminal 900 requests an electronic prescription, the electronic prescription transmitting and receiving unit 610 may request the electronic prescription from the hospital server 700. In addition, when the electronic prescription is received from the hospital server 700, the electronic prescription transmitting and receiving unit 610 may transfer the electronic prescription to the pharmacy server 800. When a request for making a payment for the medicine is received from the pharmacy server 800, the payment unit 620 may provide the user terminal with a payment service. When making the payment is completed, the payment unit 620 may transmit payment completion to the pharmacy server 800. The authentication unit 630 may perform authentication by comparing personal information received from the user terminal 900 and patient information received from the hospital server. The electronic prescription storage unit 640 may enhance security by temporarily storing the electronic prescription when the electronic prescription is received from the hospital server 700 and deleting the stored electronic prescription when reception of the medicine is informed from the user terminal. The QR code creation unit 650 may create a QR code corresponding to the received electronic prescription and transmit the QR code to the pharmacy server 800. At this point, the QR code creation unit 650 may create and provide a hash code which provides location information of the prescription information. The communication unit 660 may communicate with the hospital server 700, the pharmacy server 800 and the user terminal 900 using a wired or wireless network. The control unit 670 may control each configuration of the cloud server.

The hospital server 700 includes an EMR DB unit 710, an API builder unit 720, a hospital electronic signature unit 730, an encryption unit 740, a communication unit 750, and a control unit 760.

The EMR DB unit 710 may store patient information, medical treatment information, prescription information, clinic administration information, and history information. The types of the information stored in the EMR DB unit 710 are not limited.

The API builder unit 720 extracts patient information and prescription information from the EMR DB unit 710 and converts the patient information and the prescription information using an API. That is, the API builder unit may converts the prescription information by creating a data source, conveniently creating an SQL query through an SQL query creation guide, converting the data source into a standard data through an API builder, and repeatedly verifying the data. Therefore, data of heterogeneous DBMSs and data developed in different development languages can be standardized through the process.

The hospital electronic signature unit 730 performs authentication on the converted prescription information through the electronic signature of the clinic. The encryption unit 740 may enhance security of the converted prescription information by means of encryption, and the communication unit 750 may transmit and receive data to and from the cloud server 600, and the control unit 760 may control each configuration of the hospital server.

The pharmacy server 800 includes a medication calculation unit 810, an electronic prescription confirmation unit 820, a medication electronic signature unit 830, an electronic prescription keeping unit 840, a communication unit 850, and a control unit 860.

The medication calculation unit 810 may calculate a medicine price on the basis of the prescription information and request payment of the medicine price from the cloud server 600. The electronic prescription confirmation unit 820 may confirm the received electronic prescription and determine whether or not to prepare the medicine. The medication electronic signature unit 830 may put an electronic signature of the clinic on an electronic prescription for drugstore's keeping and store the electronic prescription in the electronic prescription keeping unit 840. The communication unit 850 may transmit and receive data to and from the cloud server 600, and the control unit 860 may control each configuration of the drugstore server.

Figure 9:
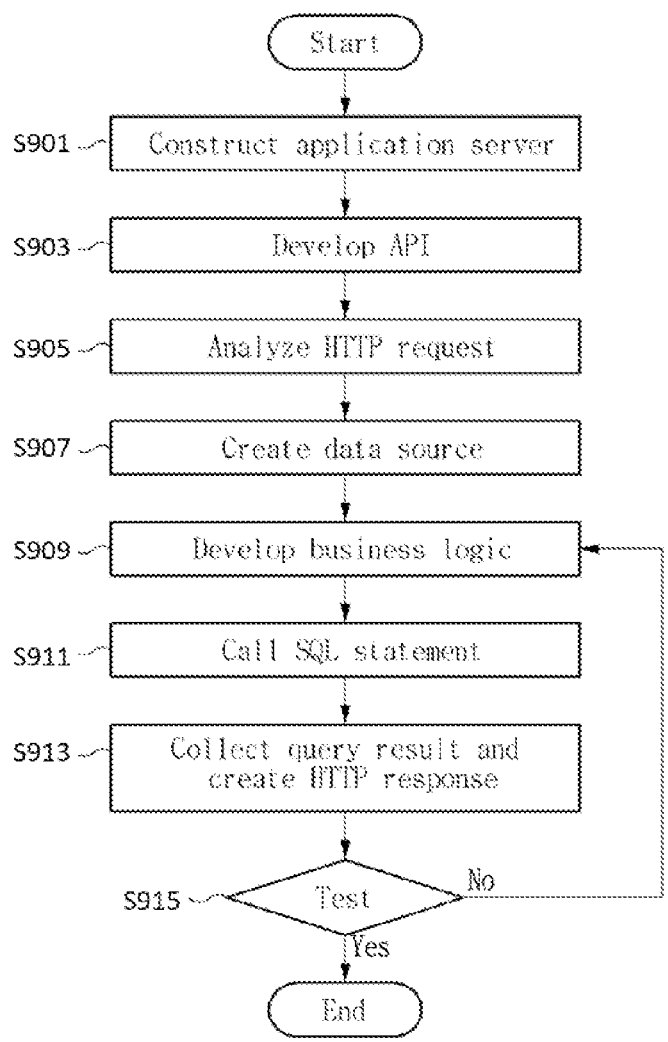
FIGS. 9 and 10 are flowcharts illustrating an operation method of an API builder unit according to an embodiment of the present disclosure.
Figure 10:
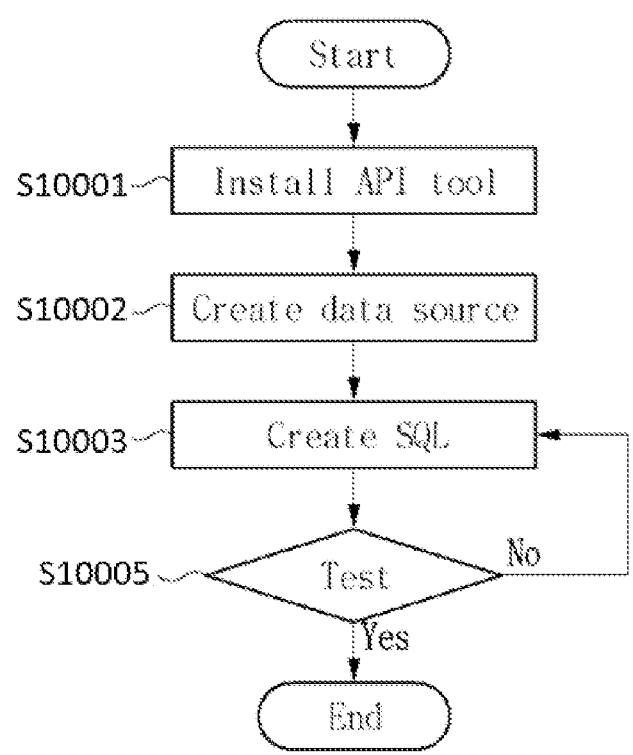

FIGS. 9 and 10 are flowcharts illustrating an operation method of an API builder unit according to an embodiment.

Referring to FIGS. 9 and 10, the API builder unit constructs an application server (step S901). The API builder unit develops an API (step S903) and analyzes an HTTP request (step S905). At this point, although the application server may be constructed as IIS, Tomcat Tuxedo, Entra or the like, it is not limited thereto. The API is a REST API and may be implemented in a language such as .Net ASP, Java or C.

Then, the API builder unit receives information from the EMR DB and creates a data source (step S907) and develops business logic (step S909). Then, the API builder unit calls an SQL statement, collects query results, and creates an HTTP response (step S913). The process terminates when a criterion is satisfied through a test or returns to the business logic development step when the criterion is not satisfied.

In addition, in another embodiment, the API builder unit installs an API tool (step S1001) and creates a data source (step S1003). Then, the API builder unit creates an SQL query (step S1005) and repeats a test (step S1007).

Figure 11:
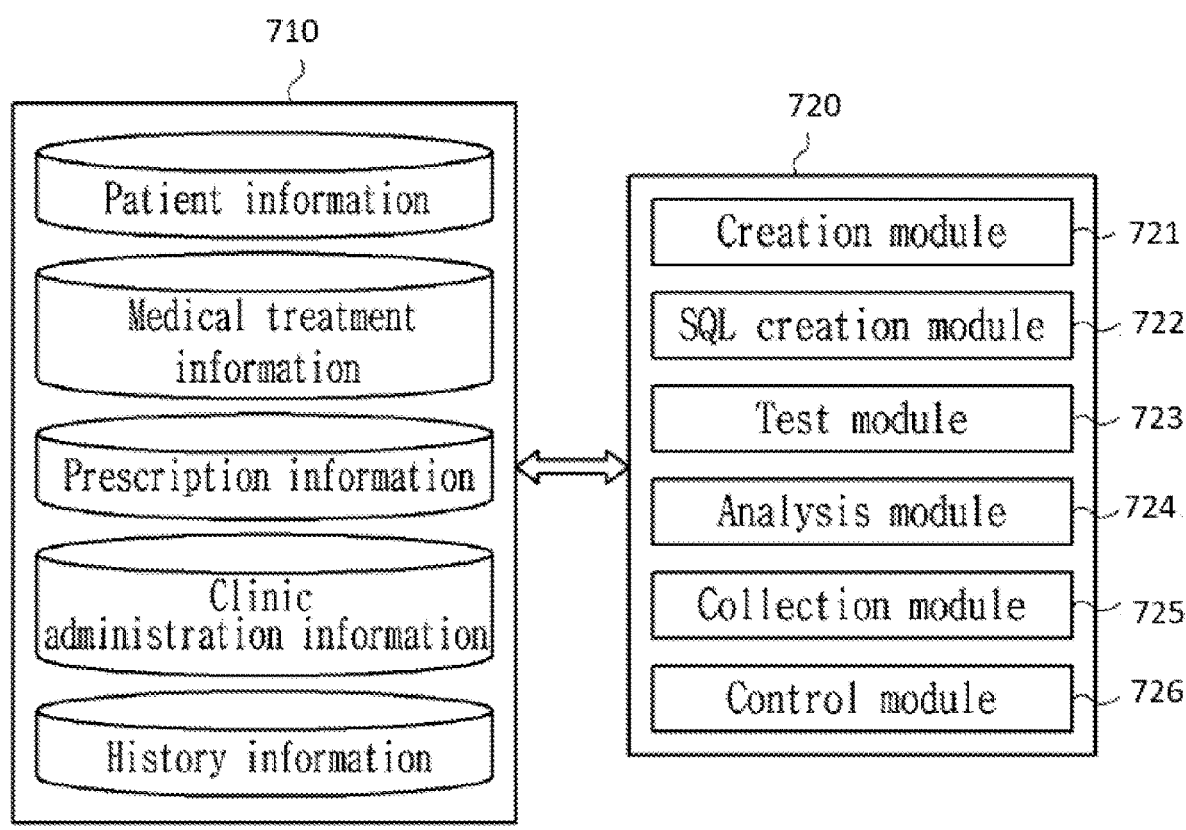
FIG. 11 is a view showing the configuration of an API builder unit according to an embodiment of the present disclosure.

FIG. 11 is a view showing the configuration of an API builder unit according to an embodiment.

Referring to FIG. 11, the API builder unit 720 includes a creation module 721, an SQL creation module 722, a test module 723, an analysis module 724, a collection module 725, and a control module 726. The creation module 721 receives patient information and prescription information among the patient information, the medical treatment information, the prescription information, the clinic administration information, and the history information stored in the EMR DB unit 710 and creates a data source. The SQL creation module 722 may create an SQL query and transfer the SQL query to the test module 723 to perform a test. The analysis module 724 may analyze an HTTP request. The collection module 725 may collect query results and create an HPPT response. The control module 726 may control each configuration of the API builder unit 720. That is, the API builder unit may receive data from the EMR DB unit 710 and convert the data into a data of a standardized output format.

Although the present disclosure has been described with reference to the exemplary embodiments illustrated in the drawings, those are only examples and may be changed and modified into other equivalent exemplary embodiments from the present disclosure by those skilled in the art. Therefore, the technical protective range of the present disclosure should be determined by the scope described in claims.

What is claimed is:

1. A method of providing a non-face-to-face electronic prescription service, the method comprising:
   a) storing prescription information in a standardized format in a hospital server having a collection of medical records stored thereon;
   b) providing remote access to users over a network so at least one of the users can apply for a non-face-to-face electronic prescription service through a graphical user interface (GUI), wherein a cloud server generates a prescription information in a non-standardized format dependent on hardware and software platforms used by the cloud server;
   c) converting, by an API builder, the generated non-standardized prescription information into the standardized format;
   d) storing the converted prescription information in the collection of medical records in the standardized format;
   e) automatically generating a message containing information of prior compounding in accordance with the converted prescription information whenever the converted prescription information has been stored; and
   f) transmitting the message to the at least one of the users over the network, so that the user has immediate access to the up-to-date information of the prior compounding in accordance with the converted prescription information,
   wherein the method further comprises:
   a step in which the hospital server provides, over a wireless network via the GUI, a prior agreement for the non-face-to-face electronic prescription service to a wireless user terminal, and the wireless user terminal applies, via the GUI, for a non-face-to-face electronic prescription service on the basis of the received prior agreement and transmits the confirmed matters in the agreement to the hospital server and the cloud server;
   a step in which the hospital server and the cloud server automatically store whether a remote patient has applied for the non-face-to-face electronic prescription service in a storage unit by storing the agreement confirmed matters on the basis of a user ID;
   a step in which when the wireless user terminal requests payment to the cloud server by executing a payment service, the cloud server automatically requests payment to the hospital server by executing a payment API;
   a step in which the hospital server automatically stores details of payment, extracts prescription information from an EMR, and automatically transmits the prescription information to the cloud server;
   a step in which the cloud server automatically generates a prescription for the remote patient and a prescription for a pharmacy when the cloud server receives the prescription information from the hospital server;
   a step in which when the cloud server transmits the automatically generated prescription for the remote patient to the wireless user terminal, the wireless user terminal, via the GUI, checks the prescription for the remote patient and requests compounding of a medicine to the cloud server;
   a step in which the cloud server automatically executes a prescription API and automatically requests compounding of a medicine to a pharmacy server when receiving the request for compound of a medicine from the wireless user terminal;
   a step in which the pharmacy server automatically requests prescription information from the cloud server by automatically executing a pharmacy demon program when receiving the request for compounding of a medicine from the cloud server;
   a step in which the cloud server automatically informs the wireless user terminal whether the prior compounding is possible, and when the wireless user terminal requests, via the GUI, the prior compounding to the pharmacy server, the pharmacy server automatically transmits whether the prior compounding has been permitted to the wireless user terminal;
   a step in which the pharmacy server automatically requests and receives certificate information of a hospital issuing the electronic prescription from the hospital server, and automatically instructs a pharmacy to perform a medicine compounding service; and
   a step in which the wireless user terminal automatically displays, via the GUI, a QR code, the pharmacy server automatically recognizes the QR code and automatically stores an electronic signature of the pharmacy and the electronic prescription,
   wherein the pharmacy server automatically transmits and stores an electronic prescription including the electronic signature of the pharmacy to a certified e-document authority server,
   wherein a pharmacy daemon program is automatically operated with a pharmacy manager program, when a medicine starts to be compounded at the pharmacy, the original of the electronic prescription is controlled to prevent other pharmacies from compounding the medicine based on the electronic prescription, automatically inform the remote patient, in real time, of the states of receipt request, receipt confirmation, compounding completion, and reception completion through a GUI of the wireless user terminal using the pharmacy manager program, a pharmacy desk PC automatically transmits prescription data to the pharmacy manager program, automatically performs encoding/decoding with an external interface, and automatically transmits QR code data using a virtual serial port, wherein the prescription information is automatically converted into standardized prescription information by the API builder, regardless of a heterogeneous database management system (DBMS) of the hospital server, so that the hospital server is permitted to store the prescription information in a non-standardized format dependent on a hardware and a software platform used by the hospital server.

* * * * *